United States Patent [19]

Vaughan

[11] Patent Number: 4,650,058

[45] Date of Patent: Mar. 17, 1987

[54] AUGER ASSEMBLY MOVING DEVICE

[76] Inventor: Hugh R. Vaughan, Box 531, Yorkton, Saskatchewan, Canada, S3N 2W4

[21] Appl. No.: 750,151

[22] Filed: Jul. 1, 1985

[30] Foreign Application Priority Data

Jul. 4, 1984 [CA] Canada ................................ 458060

[51] Int. Cl.$^4$ ............................................. B65G 41/00
[52] U.S. Cl. ..................................... 198/304; 180/16; 180/19.3; 180/70.1; 180/217; 280/43.17
[58] Field of Search .................... 180/11, 15, 16, 19.3, 180/217, 70.1; 280/43, 43.17

[56] References Cited

U.S. PATENT DOCUMENTS

| 2,892,505 | 6/1959 | Goodwin | 180/217 |
| 4,351,428 | 9/1982 | Long | 198/304 |
| 4,359,117 | 11/1982 | Vaughan | 180/217 |

FOREIGN PATENT DOCUMENTS 1169379 6/1984 Canada.

*Primary Examiner*—John J. Love
*Assistant Examiner*—Kenneth R. Rice
*Attorney, Agent, or Firm*—Stanley G. Ade

[57] ABSTRACT

Relatively heavy duty and large auger assemblies often used in present day farming are difficult to move and maneuver around a farmyard or the like and it is not always convenient to hitch a tractor to such auger assemblies for relatively short distance moving. This invention includes a small electric or gasoline motor or engine which can be operatively connected to a small wheel which is mounted within a frame secured to the auger assembly framework and which engages the ground. Means are provided so that this small wheel can be rotated in either direction. A small castoring wheel assembly supports the rear end of the auger assembly and when the small wheel is operatively connected to the motor, the wheel may be rotated slowly thus enabling the auger assembly to be moved as desired. Directional control is by steering the rear end of the auger assembly manually.

A further embodiment connects the motor and the main supporting ground engaging wheels directly. Alternatively the drive can be by means of a reversible orbital hydraulic motor connectors to the main supporting wheels.

21 Claims, 19 Drawing Figures

AUGER ASSEMBLY MOVING DEVICE

BACKGROUND OF THE INVENTION

This invention relates to new and useful improvements in devices for moving auger assemblies, particularly relatively heavy auger assemblies. It should be appreciated that the movements referred to are relatively small movements which may be required in or around a farmyard or the like and the device is not intended for long distance moving of the auger assembly, under which circumstances, it is usually hitched to a tractor or other source of motive power.

The relatively heavy auger assemblies used today in farming operations are extremely difficult to manoeuver manually and it is obviously not always convenient or economical to hitch such auger assemblies to a tractor for the relatively small movements often require in positioning such auger assemblies in relation to materials to be picked up from one location and discharged at another.

SUMMARY OF THE INVENTION

This particular invention is an improvement of my Canadian Pat. No. 1,169,279 issued June 19, 1984.

The present invention overcomes disadvantages of the general method of moving relatively large augers and in accordance with one apsect of the invention there is provided a drive attachment for auger assemblies which includes support structure, at least a pair of ground engaging wheels mounted upon said support structure and supporting an auger tube and flight assembly, and a source of power therefore; said drive attachment comprising in combination a frame, mounted upon said auger assembly, means operatively and selectively connecting said source of power to one of said ground engaging wheels, said means including gear means operatively connected to said one ground engaging wheel, drive means in said frame operatively connected to said gear means, and said drive means including a main drive shaft mounted in said frame, lay shaft means mounted in said frame, intermediate drive means on said lay shaft means, means operatively connecting said main drive shaft to said intermediate drive means for rotating same and means operatively connected between said intermediate drive means and said gear means for selectively rotating said gear means and hence said one ground engaging wheel, in either direction.

Another aspect of the invention provides a drive attachment for auger assemblies which includes support structure, a pair of ground engaging wheels mounted upon a transverse axle and supporting an auger tube and flight assembly, and a source of power therefor; said drive attachment comprising in combination a hydraulic pump connected to said source of power, an orbital motor operatively connected to said pump, a transverse axle for said ground engaging wheels, each of said ground engaging wheel being journalled for rotation one upon each end of sad axle, gear means comprising a differential gear box, output drive shafts extending from said differential gear box one upon each side thereof, means operatively connecting said orbital motor to said differential gear box for rotating said shafts in one direction or the other, said output drive shafts extending substantially parallel to said transverse axle and including means to selectively and detachably connect one to each of said ground engaging wheels.

Another advantage of the present invention is to provide a device of the character herewith described which is simple in construction, economical in operation and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the diffrent figures.

DETAILED DESCRIPTION

Proceeding therefore to describe the first embodiment of the invention in detail (illustrated in FIGS. 1 to 8), reference character 10 illustrates an auger assembly including an elongated cylindrical auger tube 11, an auger flight assembly therein indicated at the lower end thereof by reference character 12, a source of power operatively connected to the auger flight by means of belt 14, support arms 15 which are also used to raise and lower the auger assembly in a conventional manner, and ground engaging wheels 16, one of which is shown mounted upon a transverse axle 17 all of which is conventional.

Figure 1:
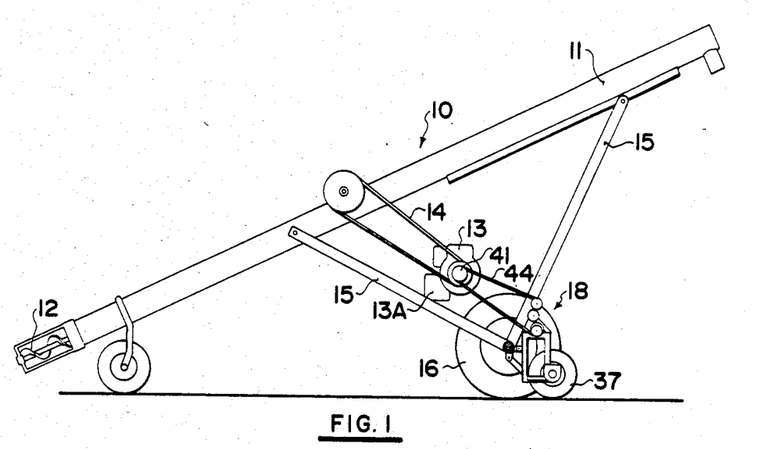
FIG. 1 is a side elevation of an auger assembly with one embodiment of the invention attached thereto.
Figure 2:
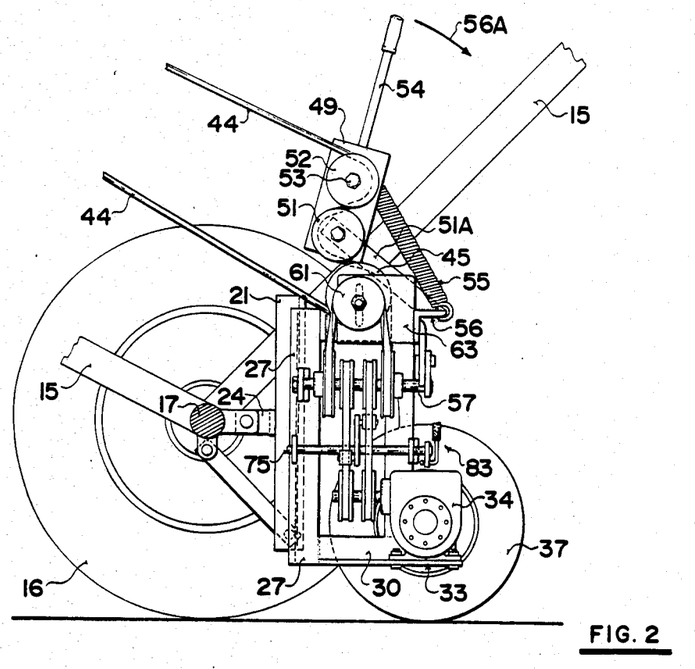
FIG. 2 is an enlarged fragmentary side elevation of the one embodiment of the invention per se.

The invention collectively designated 18 includes a fixed frame collectively designated 19 mounted for vertical movement, and a movable frame collectively designated 20 mounted upon the aforementioned front axle 17. The fixed frame includes a pair of spaced and parallel vertically situated members 21 in the form of angle irons or the like having a transversely extending base member 22 extending between the lower ends thereof and an intermediate transverse member 23 extending between the members 21 intermediate the ends thereof. The ends of this member 23 are angulated rearwardly to form spaced and parallel apertured lugs 24 and these engage between lugs 25 extending from the axle 17, by means of pivot pins 26.

The movable frame 20 includes a pair of spaced and parallel inwardly facing rear channel members 27 which slidably engage over the outwardly facing flanges 28 of the fixed frame members 21. A pair of spaced and parallel front members 29 are provided with longitudinally extending members 30 and 31 extending between the upper and lower ends of the front and rear members to form a hollow box-like frame configuration clearly shown in FIG. 8. Additional cross members 32 are provided.

A support plate 33 is secured to one of the lower longitudinal members 30 and extends outwardly therefrom to support a gear box 34 thereon having an input shaft 35 extending from one side thereof. Internally (not illustrated) is a worm gear and pinion which is conventional, with the pinion being mounted upon the drive shaft 36, said drive shaft extending across the front lower portion of the movable frame and acting as an axle for a ground engaging wheel 37 secured thereto substantially centrally of the frame thereof as shown in the drawings. The shaft is journalled for rotation within bearings 38 secured to the front of the vertical frame members 29 adjacent the lower ends thereof.

Transverse support 39 extend between the upper ends of these front members 29 and additional transverse supports or braces 40 extend between the channels 27 to for a rigid box-like frame structure.

The source of power such as gas engine 13 may be used to drive the ground engaging wheel 37 when it is desired to utilize same and in this regard, a drive pulley 41 is secured to the main drive shaft 42 of the engine 13 which also carries drive pulley 43 around which belt 14 engages to drive the auger assembly.

A drive belt 44 extends around pulley 41 and around a ground engaging wheel drive pulley 45 secured to a drive shaft 46 supported within bearings 47 and extending transversely across the upper side of the movable frame 20 with the bearings being secured to the upper longitudinal members 31 thereof.

Figure 3:
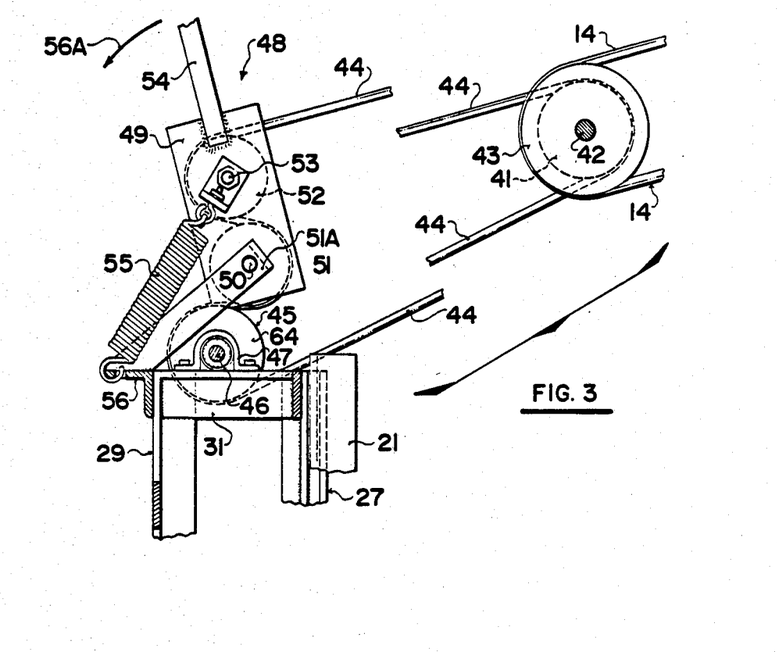
FIG. 3 is an enlarged fragmentary side elevation of the connecting and disconnecting means for the main drive belt.
Figure 4:
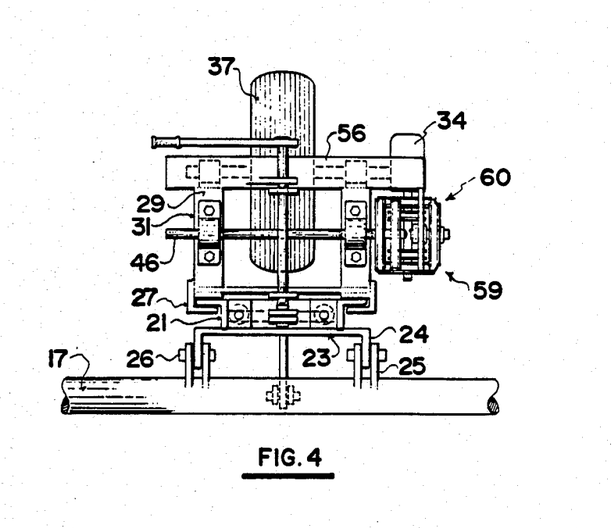
FIG. 4 is a top plan view of the device of FIG. 2.

Means collectively designated 48 are provided to selectively engage this belt with the drive pulley 45 and take the form of a bracket or plate 49 pivoted upon a pivot 50 which in turn engages a fixed bracket 51 extending upwardly and forwardly from the movable frame 20.

This pivot 50 also carries an idler pulley 51 for free rotation thereon and a further idler pulley 52 freely mounted upon pin 53 supported by the bracket or plate 49 above the first mentioned idler pulley 51 and loose belt 44 extends forwardly over the further idler pulley 52 rearwardly and over the front to the first mentioned idler pulley 51 and then over the drive pulley 45 to return to pulley 41 as clearly shown in FIG. 3. A handle 54 is secured to bracket or plate 49 and extends upwardly therefrom and a tension spring 55 extends between a support bracket 56 extending from the movable frame 20, and the bracket or plate 49 adjacent pivot 53. The relationship of the spring 55, support pivot 50 and the angulation of the support 51A are such that when the lever or handle 54 is moved in a direction opposite to arrow 56A, the spring goes over centre and holds the assembly in the position whereby drive belt 44 is loose and does not rotate drive pulley 45. However, when the handle 54 is moved in the direction of arrow 56A, the pivot 53 passes over center so that the spring 55 then maintains the bracket in the direction of the arrow 56A thus tightening belt 44 and supplying drive to pulley 45.

It should be noted that the bracket or support 49 can be mounted on either side of the frame, there being two members 51A provided one upon each side. This depends, of course, on the position of the source of power 13.

A fixed lay shaft 57 extends between support lugs 58 which in turn are secured to one of the front members 29 and one of the rear members 27 of the movable frame 20, said lay shaft extending transversely therebetween as clearly shown in FIG. 2.

A forward motion double pulley assembly 59 is freely journalled for rotation upon lay shaft 56 and a reverse motion double pulley assembly collectively designated 60 is also journalled for free rotation upon lay shaft 57, means being provided to stop endwise movement of these pulleys.

These double pulley assemblies 59 and 60 are referred to as intermediate drive means on said lay shaft in one or more of the accompanying claims.

An idler pulley 61 is journalled for rotation upon a pivot of shaft 62 supported by a bracket or plate 63 secured to the side of the movable frame 20 upon which the lay shaft 57 is secured. A further pulley 64 is secured to the main drive shaft 46 immediately outboard of the pulley 45 secured thereto and an endless belt 65 extends around this pulley 64 around one pulley 66 of the double pulley assembly 59, up over the idler pulley 61 and the around one pulley 67 of the other double pulley assembly 60 to return to the pulley 64. This arrangement rotates the double pulley assembly 59 in one direction upon the lay shaft 57 and the other double pulley assembly 60 in the reverse direction upon the lay shaft.

A pair of pulleys 68 and 69 are secured to the shaft 35 extending from the gear box 34 and one loose belt 70 extends around pulley 68 and around the other pulley 71 of the double pulley assembly 59. Another loose belt 72 extends around the other pulley 69 on shaft 35 and around the other pulley 73 of the double pulley assembly 60. It will therefore be appreciated that if belt 70 is tightened sufficiently to transmit drive from the double pulley assembly 59 to the pulley 68, shaft 55 and hence wheel 37 will rotate in one direction whereas if this belt is loosened and the other belt 72 is tightened, drive will be transmitted from the other double pulley assembly 60 to pulley 69 thus rotating same in the opposite direction and hence rotating the ground engaging wheel 37 in the opposite direction.

This reversing gear arrangement is actuated by means collectively designated 73 (see FIG. 5) to tighten one or the other of the belts 70 or 72 selectively. Said means takes the form of a bracket 74 pivoted by means of pin 75 extending between lugs 76 which in turn extend outwardly from the aforementioned front member 29 and rear member 27 of the movable frame 20.

Figure 5:
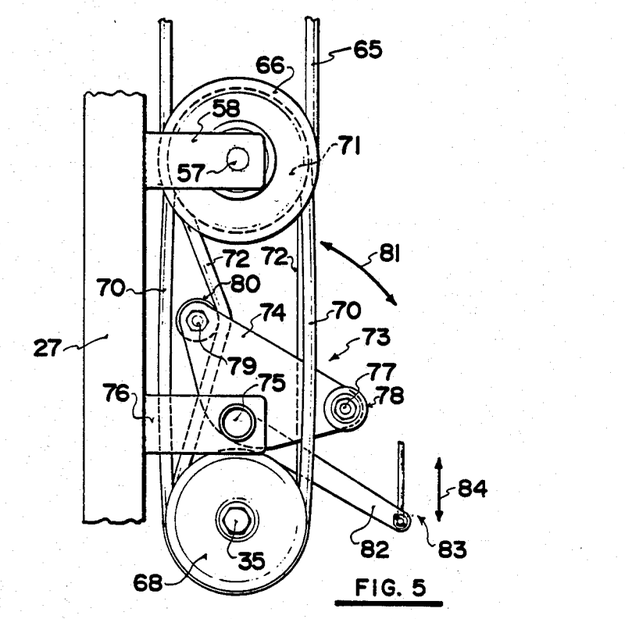
FIG. 5 is a side elevation of the device of FIG. 2.

A pivot pin 77 mounts a roller 78 for rotation on bracket 74 and further pin 79 mounts a further roller 80 also upon bracket 74 with the rollers being spaced apart as shown and being situated in a substantially triangular relationship with the pivot 75 of the bracket 74.

One roller 78 is on one side of the bracket 74 and is adapted to selectively engage belt 70 and the other roller 80 is situated on the other side of bracket 74 and is adapted to selectively engage the belt 72.

By rocking the bracket 74 in the direction of double headed arrow 81, roller 78 or 80 may engage belts 70 or 72 respectively thus transmitting drive to pulley 68 or 69 thereby causing the ground engaging wheel 37 to rotate in one direction or the other.

Means are provided to move the bracket 74 in one position or the other and may taken the form of an off standing link 82 secured to shaft or pin 75 and extending outwardly therefrom. A cable assembly 83 such as a bowden cable assembly may extend to a convenient location and be actuated to move the lever upwardly or downwardly in the direction of the arrow 84 thus rocking the bracket 74 around pivot 75 and engaging one or other of the rollers with the belts as hereinbefore described.

Means are provided to raise and lower the moveable frame 20 relative to the fixed frame 19 thereby disengaging and engaging the ground engaging wheel 37, with the ground respectively.

When in the lowerost position with the wheel engaging the ground, the pivotal mounting of the frames 19 and 20 with the axle permits a limited pivotal movement of the two frames and the drive assembly to adjust for uneven ground contours and the like. However, it will be appreciated that a stop assembly is required to limit the downward pivotal action of the frames otherwise the movable frame could not be elevated so that the ground engaging wheel 37 would be clear of the ground when in the inoperative position.

Such a stop means may include a bar 85 secured to the cross member 22 of the fixed frame 19 and extend rearwardly to engage a stop 86 secured to axle 17.

Figure 7:
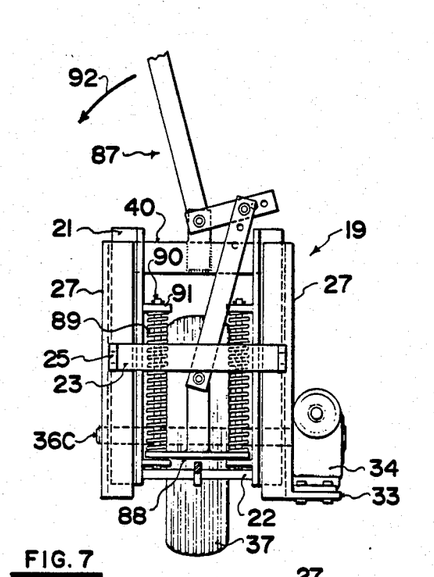
FIG. 7 is a rear view of the stationary frame supporting the device of FIG. 2.

Linkage 87 shown in FIG. 7 is operatively connected between the movable frame 20 and the fixed frame 19 via a transverse member 88 slidably engagable between the vertical members 21 of the fixed frame. Compression spring 89 extend around rods 90 and react between the member 88 and stops 91 fixed to the stationary frame 19, with the rods 90 slidably engaging apertures within the stops 91. The linkage is also an over center action so that when moved in the direction of arrow 92, the springs are compressed thus forcing the movable frame assembly 20 downwardly and bringing the wheel 37 in contact with the ground. It is maintained there by the over center action of the linkage and when the linkage is moved in the direction opposite to arrow 92, the springs force member 88 down onto the stops and as the lever continues to be moved, it forces the movable frame 20 to be raised thus lifting the wheel 37 off of the ground because the linkage is attached to the movable frame 20 and the springs are attached to the stationary frame 19. The wheel is maintained in this position by the over center action of the linkage. The springs not only maintain contact but also give some flexibility to the assembly by acting as shock absorbers.

In operation, the wheel 37 may be lowered and engaged with the ground whereupon the main drive belt 44 may be tightened by the lever or handle 54 as hereinbefore described thus supplying power to the gear box either by means of pulley 68 or 69 depending upon the direction of rotation required. This powers the auger assembly which may be moved from one location to the other and steering may be effected by moving the intake end of the auger from side to side upon the castoring tail wheel 37, it being understood that the bowden cable assembly 83 is flexible and may extend to be actuated by the operator standing adjacent the side of the auger tube.

It should be understood that the support bracket assembly 73 may be positioned so that the drive is in neutral or with one belt 70 engaged or the other belt 72 engaged respectively.

Figure 9:
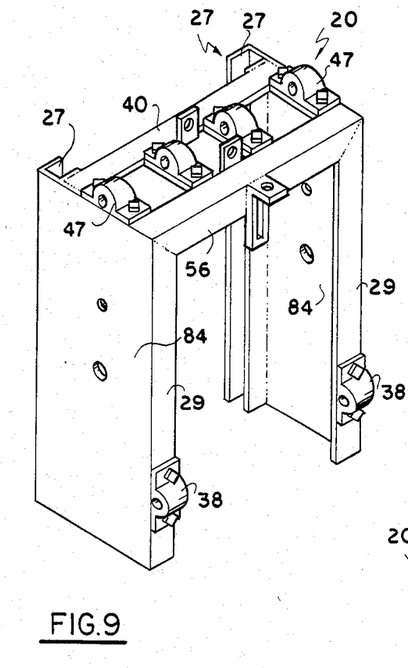
FIG. 9 is an isometric view of the movable portion of the preferred embodiment of the frame per se.
Figure 10:
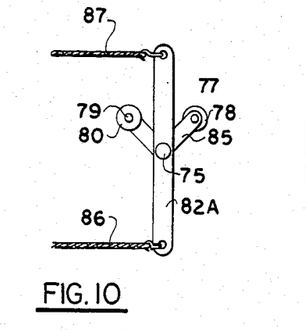
FIG. 10 is an end elevation of the preferred shifter mechanism for forward and reverse.

FIGS. 9 and 10 show further embodiments of the movable frame and shifting mechanism respectively and where common parts are shown, corresponding reference characters have been given.

Figure 8:
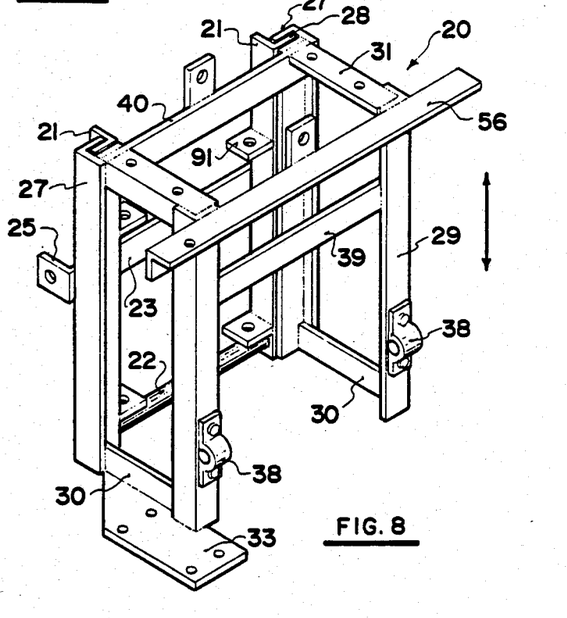
FIG. 8 is an isometric view of the supporting frame and movable frame of FIG. 2.

Dealing first with the frame in FIG. 9, it is basically the same as the frame illustrated and described in FIG. 8 with the exception that the two sides are enclosed by means of plates 84 and addtional bearing sheaves 47 are provided for the reason that will hereinafter become apparent.

In the shifter mechanism shown in FIG. 10, the actuating lever 82A is pivoted upon shaft 75 intermediate the ends thereof and stub arms 85 are spaced along the shaft and extend radially therefrom to terminate with idler pulleys 78 and 80 journalled upon pins 77 and 79 respectively. These pulleys engage the belts 70 or 72 as hereinbefore described and the control arm 82A is actuated by means of two cables 86 and 87 situated remotely from the mechanism.

Figure 11:
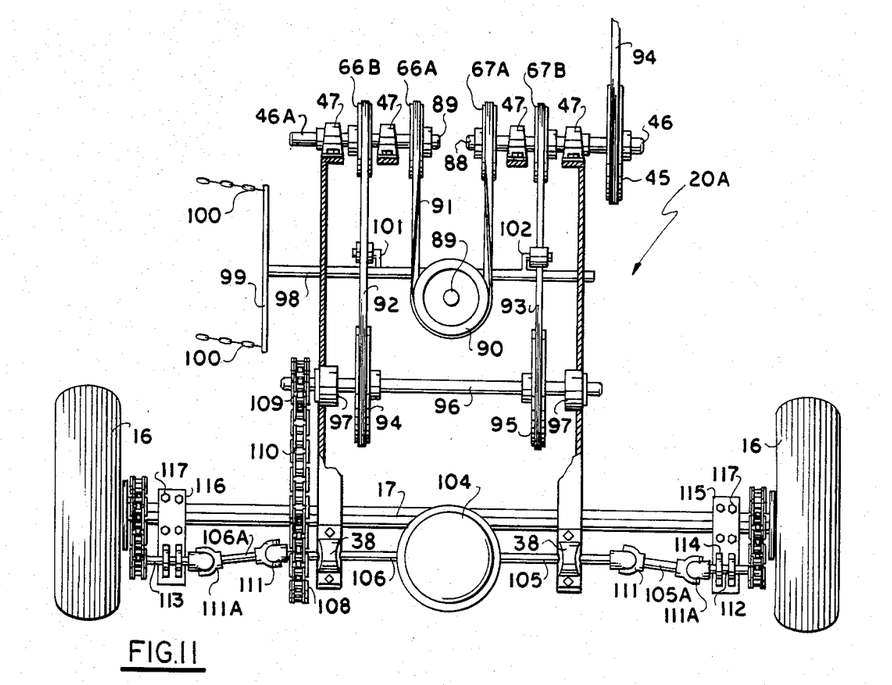
FIG. 11 is a front elevation of the preferred embodiment of the invention.
Figure 12:
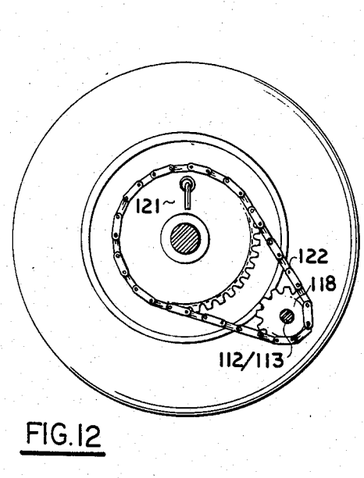
FIG. 12 is a fragmentary inside view of one of the ground engaging wheels.
Figure 13:
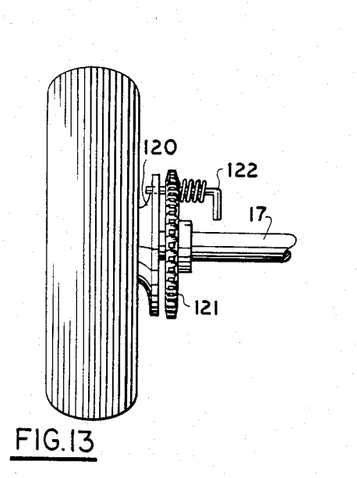
FIG. 13 is a fragmentary front elevation showing the drive to one of the ground engaging wheels.

The embodiment shown in FIGS. 11, 12 and 13 show one of the preferred modes known to the applicant. Although the structure of the drive assembly is somewhat similar, nevertheless because of the difference existing, different numbers have been given with the exception of the input of the drive from the source of power via belt 44 extending around the main drive pulley 45 which is secured to main drive shaft 46. This main drive shaft is journalled for rotation within bearings 47, on top of the frame 20 and on the right hand side thereof with reference to FIG. 9 and becomes, at its inner end thereof, a first lay shaft 88. A second lay shaft 89 is journalled for rotation on top of the frame 20, within the bearings on the left hand side of the frame with reference to FIG. 9 and is in axial alignment with the shaft 88.

The double pulley assemblies 66 and 67 of the previous embodiment, are represented by two separate pulleys 66A and 66B on lay shaft 89 and 67A and 67B on lay shaft 88, all pulleys being secured to the lay shafts so that they rotate therewith and effectively operate as the aforementioned double pulley assemblies.

A shaft 89 is supported by the frame at right angles to the axes of the lay shafts 88 and 89 and situated therebelow. A pair of idler pulleys 90 (one only of which is illustrated) are journalled for rotation upon this shaft fore and aft of the elongitudinal axes of the lay shaft 88 and 89 and an endless belt 91 extends around the pulley 67A, around one idler pulley 90, around pulley 66A and around the other idler pulley thus rotating pulleys 66A and 67A in opposite directions.

Loose belts 92 and 93 extend around pulleys 66B and driven pulley 94 on one side and around pulley 67B and driven pulley 95 on other side, said pulleys being secured to shaft 96 which in turn is journalled for rotation within bearings 97 on the front of the frame similar to bearings 38 of the previous embodiment.

A tightener assembly comprises a rod 98 supported within the frame and actuated by a lever 99 secured to one end of rod 98 intermediate ends of the lever 99. Cables 100 extend from the ends of the lever 99 and may be actuated similar to the cables 86 and 87 of the embodiment shown in FIG. 10. If desired, idler pulleys 78 and 80 may be secured to radial arms extending from rod 98 in order to tighten one or the other of belts 92 and 93 or alternatively, lugs 101 and 102 may extend from the rod and operate to tighten one or the other of the belts 92 and 93 by actuation of the lever 99. When belt 92 is tightened, pulley 66B transmits drive to pulley 94 and rotates 96 in one direction. When this belt 92 is released and belt 93 tightened, drive is transmitted via belt 93 from pulley 67B to driven wheel 95 thus rotating shaft 96 in the opposite direction in a manner similar to the reversing mechanism shown in FIG. 5 and described previously.

Figure 6:
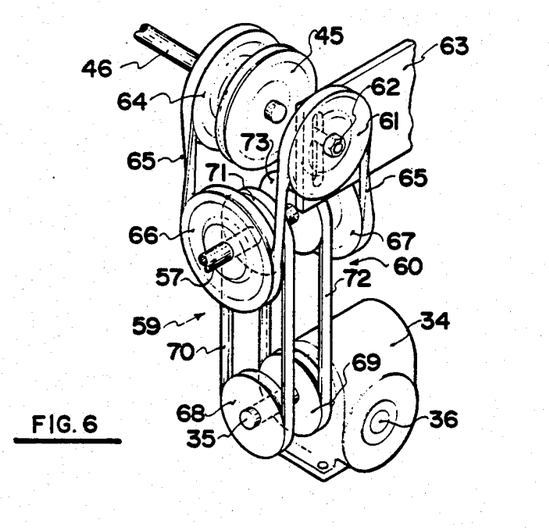
FIG. 6 is a fragmentary isometric view showing the reverse mechanism for the drive means.

This drive mechanism up to this point, can be substituted for the drive mechanism illustrated and described relative to FIGS. 5 and 6 of the previous embodiment.

However, it is preferred that this drive mechanism be applied to the main ground engaging wheels 16 rather than to the ground engaging wheel 37 of the previous embodiment.

Therefore, the frame of the embodiment illustrated in FIG. 11 and collectively designated 20A, is secured to the fixed axle 16 of the auger assembly by means of U-bolt bracket assemblies 103. Also secured to the transverse axle 16, substantially centrally thereof is a differential gear box 104, the operation of which is conventional. Output drive shafts 105 and 106 extend one upon each side of the differential gear box and are supported within bearings 107 secured to the lower ends of the frame 20 and a chain sprocket 108 is secured to the distall end of the shaft portion 106 outboard of bearing 107. The aforementioned shaft 96 is provided with a chain sprocket 109 on the distal end thereof outboard of bearing 97 and an endless chain 110 extends around sprocket 108 and 109 thus transmitting drive to the shaft 106 and hence via the differential gear box to shaft 105.

Shaft extensions 105A and 106A extend from universal joints 111 at the ends of shaft 105 and 106 and further universal joints 111A connected the distall ends of the shaft 106 of the shafts 105A and 106A respectively to wheel drive shafts 112 and 113. These shafts are supported within bearings 114 upon plates 115 and 116 secured to the distal ends of the transverse fixed axle 16 by means of U-bolt assemblies 117 and sprocket gears 118 are secured to the distal ends of shafts 112 and 113 (only one of which is illustrated in FIG. 12).

The ground engaging wheels 16 are journalled for rotation one upon each end of the transverse axle 17 and a plate 119 is secured either to the wheel or hub 120 concentrically therewith and rotatable with the wheels. A sprocket 121 is freely journalled for rotation upon the end of transverse axle 17 one adjacent each wheel 16 thereof and means are provided to detachably lock the sprocket 121 to the plate 119. Said means is shown in FIG. 13 and consists of a spring loaded pin 120 which may be engaged through sprocket 121 and into an aperture on the plate 119 as clearly shown in FIG. 13 thus detachably locking one with the other so that rotation of sprocket 121 also rotates both wheels 16 via the differential and drive shaft portions hereinbefore described, the drive from sprocket 118 to sprocket 121 is via an endless chain 122 extending around the adjacent pairs of sprockets as shown in FIG. 12. When not in use, the pins 120 may be withdrawn thus taking any load off the differential and the rest of the mechanism.

Figure 14:
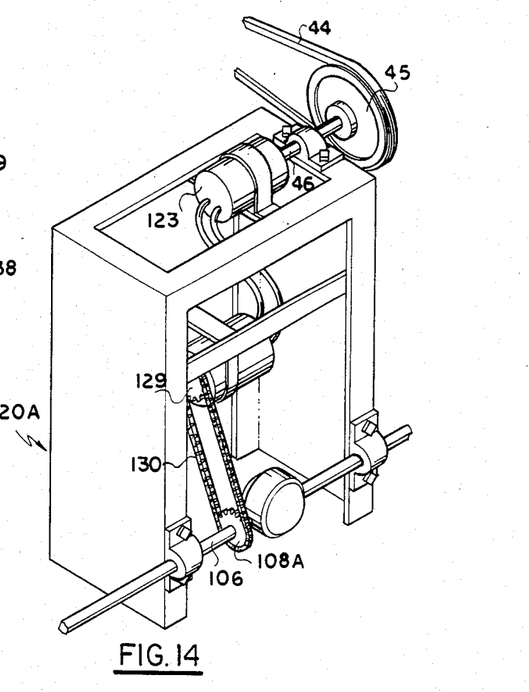
FIG. 14 is an isometric view of a yet further embodiment of the invention.
Figure 15:
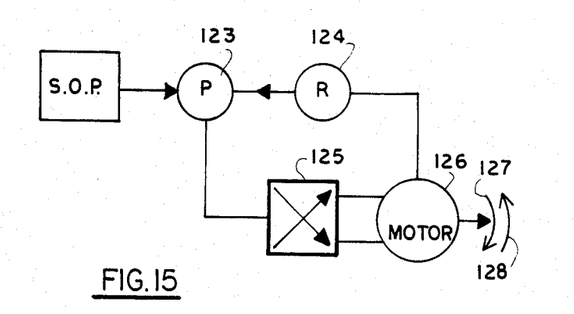
FIG. 15 is a schematic view of the hydraulic system of FIG. 14.
Figure 16:
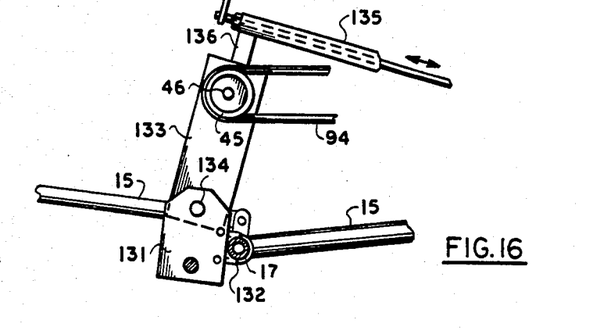
FIG. 16 is a fragmentary side elevation of the preferred embodiment.
Figure 17:
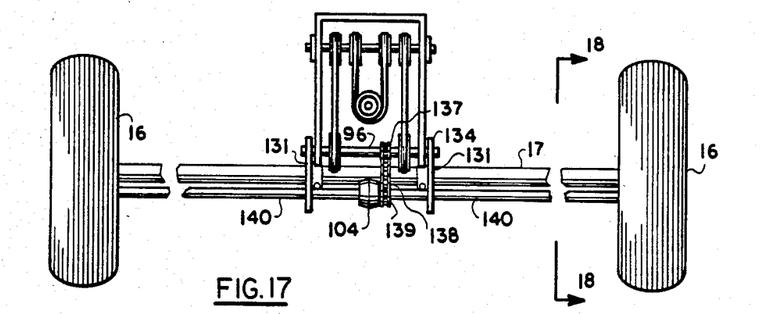
FIG. 17 is a fragmentary front view of FIG. 16.
Figure 18:
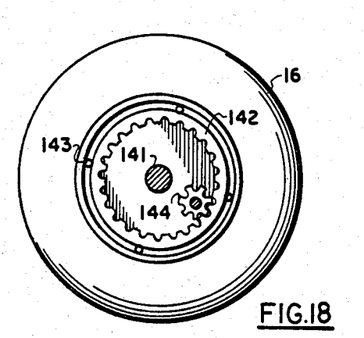
FIG. 18 is a cross sectional view along the line 18—18 of FIG. 17.

Finally, a further preferred embodiment is shown in FIGS. 14, 15 and 16 which eliminates the mechanical aspect of the last embodiment. For convenience it may be mounted within the frame 20A secured to the axle 17 by means of U-bolt assemblies 103 as hereinbefore described, it consists of a hydraulic pump 123 mounted within the frame and driven by pulley 45 from main belt 44 via drive shaft 46. Hydraulic fluid is supplied from reservoir 124 (shown in FIG. 15) and a valve assembly 125 is situated adjacent the operator and permits the transmission of fluid either back to the reservoir from the pump when idling, or to an orbital motor 126 rotating same either clockwise or anti-clockwise as indicated by arrows 127 and 128. This orbital motor drives, via a sprocket 129, an endless chain 130 which in turn is secured to sprocket 108A, similar to sprocket to 108 and secured to output drive shaft 106 as hereinbefore described. The remainder of the drive to the ground engaging wheels 16 is similar to that hereinbefore described and the double acting control valve permits rotation of the ground engaging wheels in one direction or the other depending upon the position of the control valve.

FIGS. 16 through 19 show the preferred method of mounting the drive assembly to the main axle 17 carrying the ground engaging wheels 16.

The frame work illustrated can use any of the drives shown in the previous embodiments but is preferably adapted for use with the drive shown in FIGS. 11 or 14.

The frame consists of a pair of spaced and parallel side plates 131 which are fixably secured to the axle 17 by means of U-calmps 132 or the like.

A pair of spaced and parallel upper side plates 133 are pivoted one each to adjacent the other sides of the side plate 131, by means of cross pivot shaft 134.

The main drive belt 94 engages around drive pulley 45 mounted upon drive shaft 46 and this drive shaft may either drive the mechanisms such as shown in FIG. 11 or the pump 123 as shown in FIG. 14.

A screw jack assembly 135 operatively extends between a bracket 136 extending upwardly from one of the upper plates 133 and a fixed location on the auger assembly (not illustrated). This enables the upper plates 133 to be moved around shaft 134 to loosen or tighten belts 94 around pulley 45 thus disengaging or engaging the source of power with the pulley 45 in the manner similar to actuation by lever 54 shown in FIG. 2.

Another reason for pivoting the upper plates 133 to the lower plates 131 is to maintain the tension in belt 94 when the auger assembly is raised and lowered by conventional means under which circumstances the axle 17 together with plates 131 will rotate forwardly or rearwardly with the upper plates 133 remaining stationary thus maintaining tension in belt 94.

Regardless of the method of the drive, lay shaft 96 is rotated in either direction together with sprocket 137 secured thereto. Sprocket chain 138 extends around the sprocket and around a further sprocket 139 operatively secured to the differential 104 thus rotating the two drive shafts 140 in either direction, it being understood that the ground engaging wheels 16 are journalled for rotation on step shafts 141 on the ends of the main axle 17.

The drive shafts 140 are preferably rigid in this embodiment and means are provided to selectively engage and disengage these drive shafts with the wheels 16. Said means takes the form of a ring gear 142 bolted concentrically to the inside of the ground engaging wheels 16 by means of bolts 143. A small gear 144 is secured to each end of the output drive shaft 140 and normally engages the ring gears 142 as clearly shown in FIG. 18 thus rotating the ground engaging wheels in either direction depending upon the direction selected.

Figure 19:
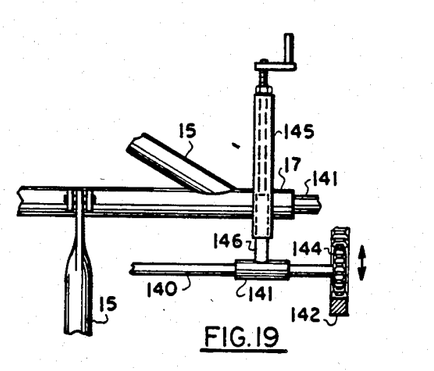
FIG. 19 is a fragmentary top plan view showing the drive connection to the ground engaging wheel.

When it is desired to disengage gears 144 from ring gears 142, as for example when transporting the the auger assembly, a conventional screw jack assembly 145 is used which is mounted on the wheel axle 17 adjacent the outer end thereof with the inner movable portion 146 being connected to sleeve 147 which freely surrounds the output drive shaft 140 as shown in FIG. 19. There is sufficient flexibility in the output drive shafts 140 to permit the distal or outer ends thereof to be moved so that gear 144 engages or disengages the ring gear 142.

It will therefore be seen that a relatively simple construction is provided to selectively rotate the ground engaging wheels 16 thus supplying the necessary motive power to move the auger assembly over relatively short distances.

Since various modifications can be made in my invention as hereinabove described, and many apparently widely different embodiments of the same made within the spirit and scope of the claims without departing from such spirit and scope, it is intended that all matter contained in the accompanying specification shall be interpreted as illustrative only and not in a limiting sense.

I claim:

1. A drive attachment for auger assemblies which includes support structure, at least a pair of ground engaging wheels mounted upon said support structure and supporting an auger tube and flight assembly, and a source of power therefore; said drive attachment comprising in combination a frame, mounted upon said auger assembly, means operatively and selectively connecting said source of power to at least one of said ground engaging wheels, said means including gear means operatively connected to said gear means, and said drive means including a main drive shaft mounted in said frame, lay shaft means mounted in said frame, intermediate drive means on said lay shaft means, means operatively connecting said main drive shaft to said intermediate drive means for rotating same and means operatively connected between said intermediate drive means and said gear means for selectively rotating said gear means and hence said one ground engaging wheel, in either direction, said gear means including a transverse axle for said ground engaging wheels, each of said ground engaging wheels being journalled for rotation one upon each end of said axle, said gear means including a differential gear box, output drive shafts extending from said differential gear box, one upon each side thereof, means operatively connecting said drive means to said differential gear box for rotating said output drive shafts in one direction or the other, said output drive shafts extending substantially parallel to said transverse axle and including means to selectively and detachably connect one to each of said ground engaging wheels.

2. The drive attachment according to claim 1 in which said intermediate drive means includes a first, forward motion double pulley mounted for rotation on said lay shaft means, and a second, reverse motion double pulley mounted for free rotation on said lay shaft means, means operatively connecting one of said pulleys of said first double pulley to said main drive shaft for rotation of said first double pulley in one direction and one of said pulleys of said second double pulley to said main drive shaft for rotation in the opposite direction, a pair of pulleys operatively connected to said gear means, loose belts extending around the other pulleys of said first and second double pulleys and around corresponding pulleys of said pair of pulleys operatively connected to said gear means, and means selectively engaging one or the other of said belts to tighten same and drivingly connect said first or second double pulley to one or the other of said pair of pulleys and hence rotate said gear means in one direction or the other.

3. The drive attachment according to claim 2 in which said means operatively connecting said main drive shaft to said intermediate drive means includes a drive pulley secured to said main drive shaft, an idler pulley mounted to said movable frame, an endless belt engaging around said drive pulley, around said one pulley of said first and second double pulleys and around said idler pulley thereby rotating said first double pulley in one direction upon said lay shaft and said second double pulley in the opposite direction upon said lay shaft.

4. The drive attachment according to claim 2 in which said means selectively engaging one or the other of said belts includes a bracket mounted for pivotal movement upon said movable frame, loose belt engaging means mounted on said bracket for each of said loose belts and means extending from said bracket for pivoting same in one direction to operatively engage one of said loose belt engaging means with one of said loose belts, and in other direction for operatively engaging the other of said loose belt engaging means with the other of said loose belts, selectively.

5. The drive attachment according to claim 4 in which said means supporting said frame upon said axle for selective vertical movement includes a vertically situated support framework secured to said axle and including a pair of vertically situated spaced and parallel guide members, said movable frame including a pair of spaced and parallel substantially vertical guide engaging members engaging said guide members and being supported thereby for vertical sliding movement relative thereto, and a linkage assembly operatively connected between said supporting framework and said movable frame, said linkage assembly including an operating lever and linkage extending between said lever and said movable frame in an over center relationship whereby said movable frame is in the raised position when said linkage is over center in one direction and is in the lowered position when said linkage is over center in the other direction, said ground engaging wheel being clear of the ground when said movable frame is in the raised position and in contact with the ground when said movable frame is in the lowermost position.

6. The drive attachment according to claim 2 in which said lay shaft means includes a first lay shaft formed as an extension of said main drive shaft and journalled for rotation within said frame, and a second lay shaft also journalled for rotation within said frame and in axial alignment with said first lay shaft, said first and second double pulleys mounted for rotation with said lay shafts.

7. The drive shaft attachment according to claim 6 in which said means selectively engaging one or the other of said belts includes a bracket mounted for pivotal movement upon said movable frame, loose belt engaging means mounted on said bracket for each of said loose belts and means extending from said bracket for pivoting same in one direction to operatively engage one of said loose belt engaging means with one of said loose belts, and in other direction for operatively engaging the other of said loose belt engaging means with the other of said loose belts, selectively.

8. The drive attachment according to claim 1 which includes means to engage and disengage said drive means to said source of power, selectively.

9. The drive attachment according to claim 8 in which said means to engage and disengage said drive means from said source of power includes a belt pulley driven by said source of power, a drive pulley secured to said drive shaft, a mounting member pivoted adjacent one end thereof to said movable frame, adjacent to said drive pulley an idler pulley for said mounting member journalled for rotation upon said mounting member to said moveable frame and a further idler pulley journalled for rotation to said mounting member and spaced from said first idler pulley, and an endless belt engaging around said belt pulley, around said further idler pulley, around said first idler pulley in a reverse direction from said further idler pulley and around said drive pulley and means to move said mounting member around said pivot to tighten and loosen said belt selectively and hence operatively connect and disconnect said source of power from said drive shaft.

10. The drive attachment according to claim 1 in which said means supporting said frame upon said axle for selective vertical movement includes a vertically situated support framework secured to said axle and including a pair of vertically situated spaced and parallel guide members, said movable frame including a pair of spaced and parallel substantially vertical guide engaging members engaging said guide members and being supported thereby for vertical sliding movement relative thereto, and a linkage assembly operatively connected between said supporting framework and said movable frame, said linkage assembly including an operating lever and linkage extending between said lever and said movable frame is in the raised position when said linkage is over center in one direction and is in the lowered position when said linkage is over center in the other direction, said ground engaging wheel being clear of the ground when said movable frame is in the raised position and in contact with the ground when said movable frame is in the lowermost position.

11. The drive attachment according to claim 1 in which said last mentioned means includes support means on each axle adjacent the outer end thereof, a connecting shaft journalled for rotation in each support means, first sprocket means secured to the outer end of each said connecting shafts, second sprocket means freely journalled upon each outer end of said transverse axle adjacent each ground engaging wheel, means operatively connecting said adjacent first and second sprocket means together, and means to detachably connect said second sprocket means to said adjacent ground engaging wheel for rotation therewith.

12. The drive attachment according to claim 11 in which said last mentioned means includes a spring loaded pin on said second sprocket means selectively engaging plate means secured to said ground engaging wheel concentric therewith.

13. The drive attachment according to claim 1 in which said means to selectively and detachably connect said output drive shaft, one to each of said ground engaging wheels, includes a ring gear secured to each said ground engaging wheel concentric therewith and a ring gear engaging gear on the distall end of said output drive shafts engageable with said ring gears.

14. The drive attachment according to claim 13 which includes means to selectively engage and disengage said ring gear engaging gear with said ring gear.

15. The drive attachment according to claim 14 in which said means to selectively engage and disengage said ring gear engaging gear with said ring gear includes a screw jack assembly mounted on said transverse axle and operatively connecting to said output drive shaft to move the distall end thereof whereby said ring gear engaging gear engages and disengages with said ring gear selectively.

16. A drive attachment for auger assemblies which includes a support structure, a pair of ground engaging wheels mounted upon a transverse axle and supporting an auger tube and flight assembly, and a source of power therefor; said drive attachment comprising in combination a hydraulic pump connected to said source of power, an orbital motor operatively connected to said pump, a transverse axle for said ground engaging wheels, each of said ground engaging wheels being journalled for rotation one upon each end of said axle, gear means comprising a differential gear box, output drive shafts extending from said differential gear box one upon each side thereof, means operatively connecting said orbital motor to said differential gear box for rotating said shafts in one direction or the other, said output drive shafts extending substantially parallel to said transverse axle and including means to selectively and detachably connect one to each of said ground engaging wheels.

17. The drive attachment according to claim 16 in which said last mentioned means includes support means on each axle adjacent the outer end thereof, a connecting shaft journalled for rotation in each support means, first sprocket means secured to the outer end of each said connecting shafts, second sprocket means freely journalled upon each outer end of said transverse axle adjacent each ground engaging wheel, means operatively connecting said adjacent first and second sprocket means together, and means to detachably connect said second sprocket means to said adjacent ground engaging wheel for rotation therewith.

18. The drive attachment according to claim 17 in which said last mentioned means includes a spring loaded pin on said second sprocket means selectively engaging plate means secured to said ground engaging wheel concentric therewith.

19. The drive attachment according to claim 16 in which said means to selectively and detachably connect said output drive shaft, one to each of said ground engaging wheels, includes a ring gear secured to each said ground engaging wheel concentric therewith and a ring gear engaging gear on the distall end of said output drive shafts engageable with said ring gears.

20. The drive attachment according to claim 19 which includes means to selectively engage and disengage said ring gear engaging gear with said ring gear.

21. The drive attachment according to claim 20 in which said means to selectively engage and disengage said ring gear engaging gear with said ring gear includes a screw jack assembly mounted on said transverse axle and operatively connecting to said output drive shaft to move the distall end thereof whereby said ring gear engaging gear engages and disengages with said ring gear selectively.

* * * * *